Nov. 29, 1938.  P. M. BOURDON  2,138,136
AXLE SUSPENSION FOR VEHICLES.
Filed March 11, 1937   2 Sheets-Sheet 1
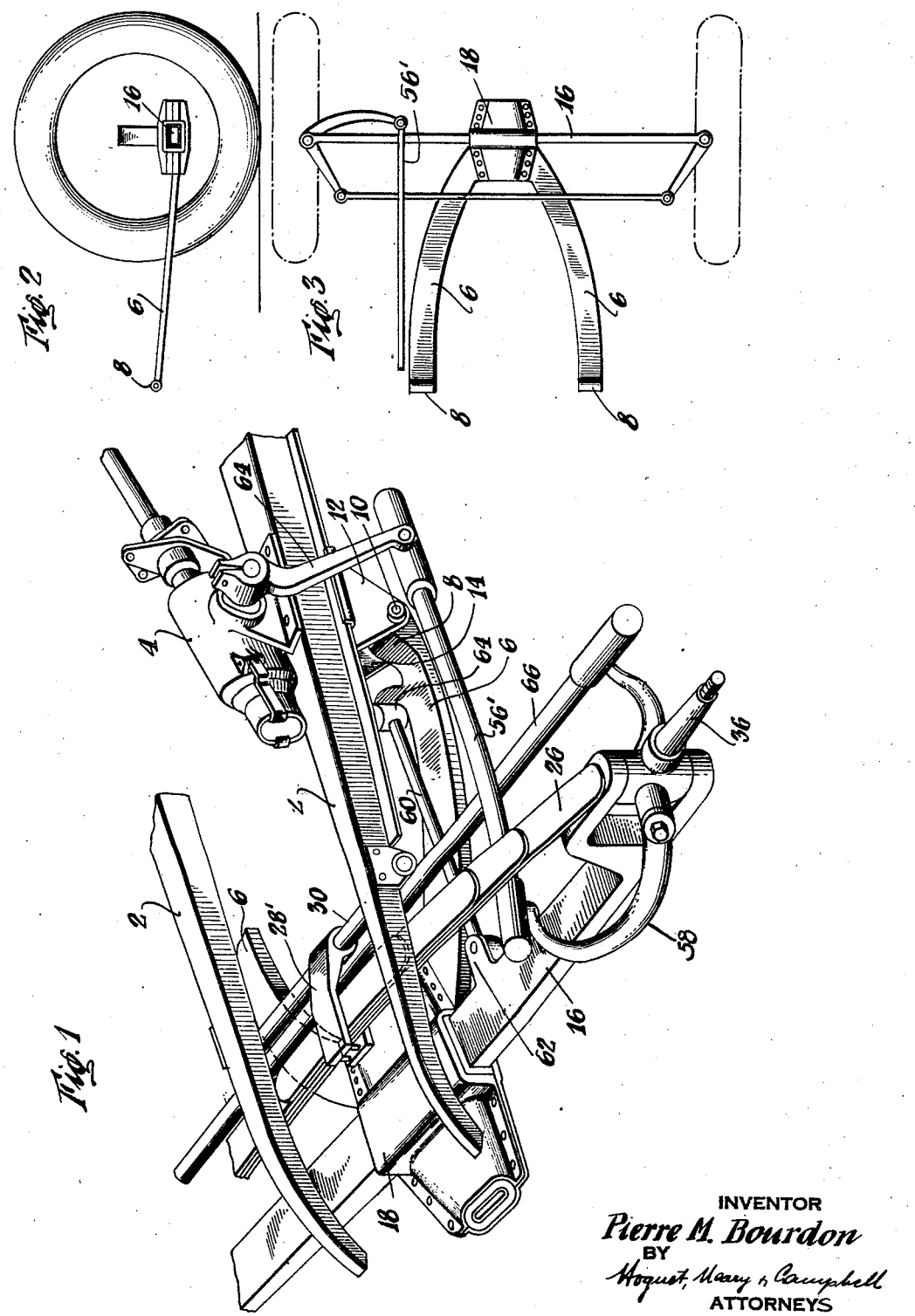
INVENTOR
*Pierre M. Bourdon*
BY
*Hoguet, Neary & Campbell*
ATTORNEYS Nov. 29, 1938.  P. M. BOURDON  2,138,136
AXLE SUSPENSION FOR VEHICLES
Filed March 11, 1937   2 Sheets-Sheet 2
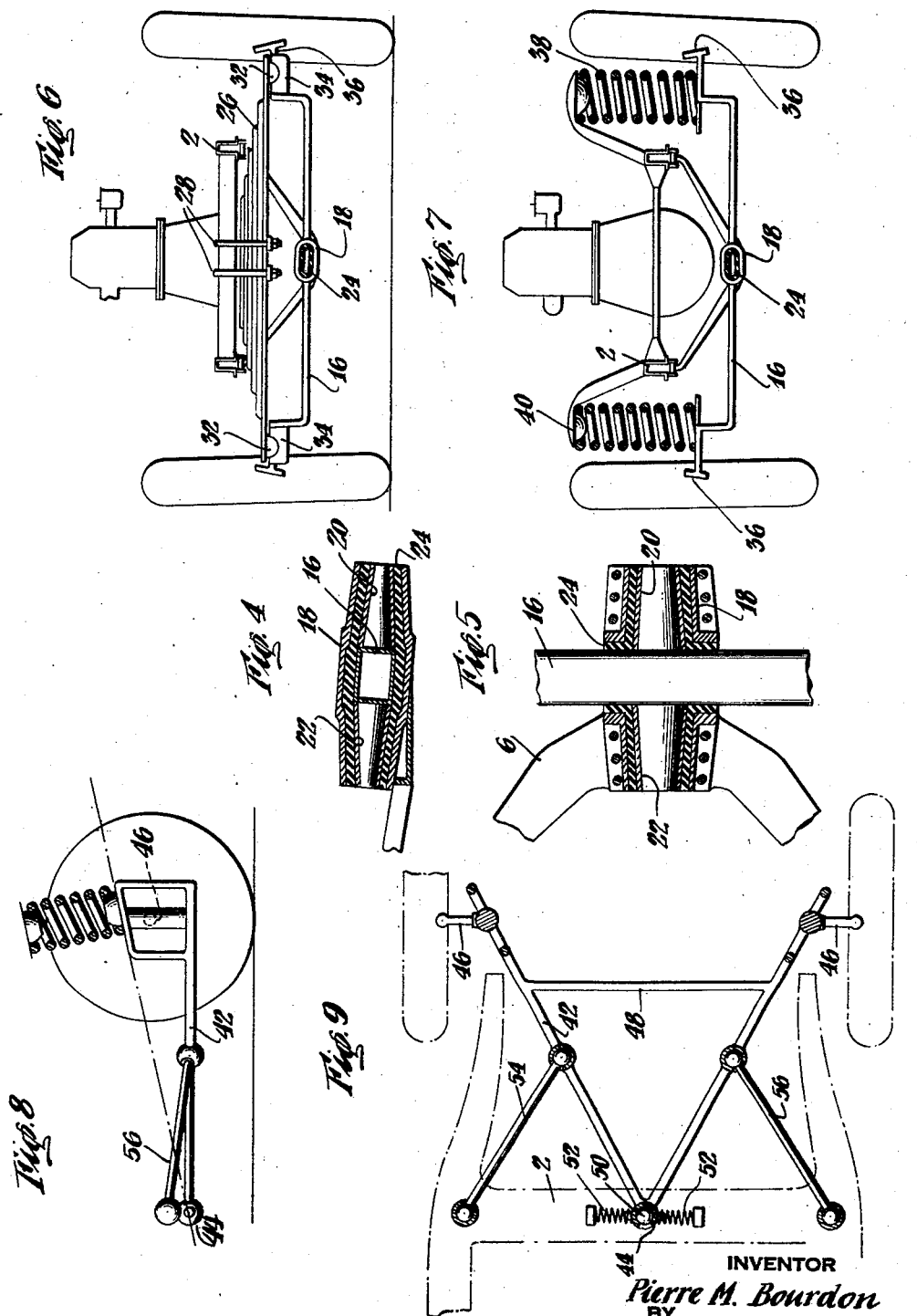
INVENTOR
Pierre M. Bourdon
BY
Moquet, Neary & Campbell
ATTORNEYS Patented Nov. 29, 1938

2,138,136

UNITED STATES PATENT OFFICE 2,138,136

AXLE SUSPENSION FOR VEHICLES

Pierre Marcel Bourdon, Paris, France, assignor to Michelin & Cie, Clermont-Ferrand, France, a corporation of France Application March 11, 1937, Serial No. 130,263

11 Claims. (Cl. 267—20)

This invention relates to axle mountings for vehicles and has particular reference to mountings for the front axles of motor vehicles.

In fast automobiles there has been a tendency for the front wheels thereof to rebound, swing and shimmy, causing considerable difficulty in steering, as well as preventing easy riding. These phenomena were caused by gyroscopic torque set up by simultaneous rotary movement of the wheels and angular displacement of the same. As is well known angular displacement of a rotating body will cause a strong wobbling motion to be set up resisting the displacement of the body and in case of vehicle wheels results in shimmying. Shimmying was largely overcome by the use of relatively inflexible springs resisting angular displacement of the wheels, but also decreasing the comfortable riding qualities of the vehicle. In order to increase the riding qualities of the vehicles and to avoid shimmying of the wheels, automobiles recently have been equipped with independent front wheel mountings, such as the "knee action" type. This type of mounting has given improved results so far as easy riding qualities are concerned but has resulted in other undesirable characteristics, for example, when highly resilient springs are used in conjunction with the independent wheel mountings a decided rolling action of the vehicle results, particularly when making turns. This rolling action causes the vehicle to heel over or nose down toward one side, thereby shifting the center of gravity and tending to cause the vehicle to turn over. As an incident of this rolling action, great wear of the front tires results. The reason for this is that the linkage between the vehicle frame and the wheels is such as to cause the wheels to change their pitch with regard to the road, producing a relatively lateral sliding action of the wheels with respect to the road. The wheels tend to remain substantially perpendicular to the plane of the frame so when the frame rolls the wheels also rock into positions of greater inclination to the road and outwardly of the curve. To avoid rolling of the vehicle, it has been found necessary to use less resilient springs on the front wheel mountings and such springs offset, because of their resistance to movement, the easy riding qualities obtained from the independent wheel mounting.

This invention relates to means for allowing substantially independent movement of the wheels of motor vehicles relative to the vehicle body without losing the advantages obtained by the use of a continuous front axle. With such a construction, springs of great resilience may be used for carrying the weight of the vehicle, and yet undesirable rolling or shimmying of the wheels is avoided. Also, because of the rigidity between the front wheels resulting from the use of a strong axle, there is less wear on the tires.

One form of the invention may suitably consist of a relatively rigid yoke member attached to the car frame in such a manner that it is limited to movement toward and from the frame, only. Suitable constructions may be provided for preventing any lateral movement of the yoke relative to the frame, thereby avoiding oscillation of the yoke in a horizontal plane when the brakes are applied on the front wheels. In order to allow free movement of the axle relative to the vehicle, means are provided for allowing substantially universal rotational movement of the axle and the wheels relatively to the yoke, such universal movement being limited and cushioned by means of suitable resilient mountings, which resist the movement of the axle but still allow it to be shifted in response to road shock.

More specifially, one form of the invention may consist of a generally V-shaped yoke member, the free legs of which are pivotally connected to the vehicle frame allowing movement of the closed end of the yoke toward and from the frame. Carried at the closed end of the yoke member is a housing member through which passes the front axle of the vehicle. A rubber sleeve may be mounted between the axle and the housing, such a sleeve being sufficiently thick and resilient to allow only limited rotational movement of the axle in all directions relatively to the housing.

A further form of the invention may consist of a yoke member connected to the framework of the vehicle by a universal mounting and being held against movement in a lateral direction by means of universally connected radius rods. In this form of the invention the apex of the yoke carries the universal connection and the free ends or legs of the yoke carry the axle member. If desired, only short axle members need be mounted on the yoke member, and these in spaced apart relationship, so that a front wheel drive may be used in conjunction with the axle mounting. In this construction limited rotary movement of the axle and yoke member around the axis of the latter is permitted, thereby allowing substantially independent movement of the wheels relatively to the vehicle frame.

With either type of axle, any type of spring mounting may be used. For example, transverse leaf springs, longitudinal springs, or coil springs may be used to advantage.

Because of the slight oscillation of the axle about a vertical axis, it is desirable to adapt a steering mechanism to the construction which will prevent swerving of the wheels as the axle oscillates. In order to accomplish this result it has been found that by connecting the steering rod to the steering lever on the wheel spindles at a point in the vicinity of the vertical axis of oscillation of the axle, no swerving of the wheels is permitted.

Many advantages result from the use of axle mountings embodying the invention. The yoke member serves as a strong supporting member for the axle, thus relieving the springs of the task of holding the axle in its proper transverse position perpendicular to the longitudinal axis of the vehicle. Furthermore, the yoke member, while in the nature of radius rods does not allow axial movement of the axle which must be resisted by the vehicle springs. Thus the springs act merely as cushioning means and not as structural members resisting lateral and twisting movements of the axle as in all other types of axle mountings now used on vehicles. The springs may thus be decreased in strength and rendered more flexible; consequently, improving the riding comfort of the vehicle.

Another advantage resulting from the use of the invention is that nosing down or "diving" of the vehicle may be avoided when the brakes are applied. In vehicles having four wheel brakes the inertia of the body throws the greater part of the weight on the front spring or springs when the brakes are applied thus depressing the front springs and causing the front end of the vehicle to dive.

The force of inertia is divided into a forward component and a downward component. The effect of the brakes on the wheels produces an antagonistic torque consisting of rearward and upward components of force. By judiciously selecting the length of the yoke to produce a lever through which the antagonistic torque of the wheels is applied to the frame, the downward component of the force of inertia may be neutralized thereby causing the body of the vehicle to travel horizontally during deceleration by braking.

For a better understanding of the invention, reference may be had to the accompanying drawings, in which:

Figure 1 is a perspective view of one form of the invention as applied to a vehicle framework, portions of the axle and the framework being broken away;

Figure 2 is a view in vertical section of the axle and yoke disclosed in Figure 1;

Figure 3 is a plan view of the axle and yoke disclosed in Figure 1;

Figure 4 is an enlarged sectional view of the housing for mounting the axle on the yoke, partly broken away;

Figure 5 is a horizontal sectional view of the housing for mounting the axle, with the yoke partly broken away;

Figure 6 is a diagrammatic view of the front end of a vehicle showing the manner in which the axle is mounted on the vehicle frame;

Figure 7 is a diagrammatic view of a modified form of spring suspension for the axle;

Figure 8 is a diagrammatic side view of a modified form of axle mounting;

Figure 9 is a plan view of the axle mounting disclosed in Figure 8.

Illustrated in Figure 1 is one form of the invention consisting of a vehicle frame 2, carrying any suitable type of steering mechanism 4. Connected to the framework 2 is a generally V-shaped yoke member 6 having its free ends 8 pivotally connected by means of any desired type of pivotal connection of the vehicle frame 2. As illustrated, the free ends 8 are mounted by means of a pivot pin 10 between spaced lugs 12 and 14. The yoke, as a whole, is thus allowed to pivot about the pivot pins 10 in a direction toward and from the vehicle frame 2 only, thus providing a very rigid and strong mounting for a vehicle axle 16. The axle may be suitably mounted in a tubular housing 18, fixed in any suitable manner to the free end of the yoke 6. The axle 16, as best shown in Figures 4 and 5, may be provided with frusto-conical members 20 and 22 extending laterally from the axle in a generally horizontal direction. Completely surrounding a portion of the axle and the frusto-conical members 20 and 22 is a rubber sleeve 24. The rubber sleeve, if desired, may be bonded to the housing 18 and the axle 16 as well as the frusto-conical members 20 and 22 in any desired manner to cause them to adhere and prevent separation.

The rubber sleeve 24 allows a limited universal rotational movement of the axle 16 and also tends to normally resist such universal movement of the axle. In addition, sleeve 24 tends to dissipate road shock which would normally be transmitted directly from the yoke 6 to the vehicle frame, thereby reducing vibration in the vehicle frame 2.

Any desired type of spring system may be used in conjunction with the axle mounting. As illustrated in Figure 1 and as diagrammatically shown in Figure 6 a transverse leaf spring 26 may be affixed to the framework 2 of the vehicle, either through the use of U-bolts 28, shown in Figure 6, or by means of a clamping member 28' rigidly connected to a transverse bracing rod 30 affixed to the vehicle frame 2. If desired the ends of the leaf spring 26 may be connected by shackles to the axle 16 or by suitable rubber connections, but, as illustrated, the leaf preferably carries a ball joint 32 disposed in socket members 34 on the axle member 16, adjacent the pivotally connected wheel spindles 36, thus allowing oscillatory movement, both in a horizontal or vertical plane, and also a slight rotary movement of the axle 16.

As illustrated in Figure 7, the coil springs 38 may be alternatively used to replace the transverse leaf springs illustrated in Figures 1 and 6. These coil springs 38 may suitably bear against the axle 16 adjacent the wheel spindles 36 and extensions 40 from the framework 2.

A modified form of axle mounting is illustrated in Figures 8 and 9. This type of mounting may consist of a generally V-shaped yoke member 42 carrying a spherical socket 44 at its apex and short wheel spindles 46 at its free ends. The yoke member 42 forms an axle for supporting the wheels. As best shown in Figure 9, the spindles 46 are spaced apart, thereby allowing the differential of a front wheel drive system to be disposed between the spindles, if desired. The yoke member may be provided with a suitable transverse strengthening member 48. The socket member 44 may receive a substantially spherical socket ball on the vehicle frame 2 and with relatively loose fit, thereby allowing limited movement of the ball in all directions. Spring means 52 may be provided for centering the ball 50 in the socket 44 and tending to resist lateral movements of the yoke member 42. Extended lateral movement of the yoke member is prevented by means of radius rods 54 to 56, universally connected to the yoke member 42 and the vehicle frame 2 substantially in the plane of the universal connections 44, 50, but allowing movement of the yoke and the spindles 46 toward and from the vehicle frame 2. In addition, the radius rods 54 and 56 allow limited rotary movement of the yoke member about its longitudinal axis.

Either of the constructions illustrated improve the riding qualities of a vehicle without causing undue wear upon the tires. Additionally, shimmying and rolling of the vehicle are avoided even though highly flexible springs are used to space the axle from the vehicle frame. An additional feature residing in the axle mounting consists of so arranging the length of the yoke member that nosing down of the vehicle is prevented when the brakes are applied. As is common in all vehicles using four-wheel brakes, the application of the brakes causes a lunging forward or nosing down of the vehicle. The yoke members may be utilized to so equalize the components of the force of inertia of the vehicle body by the antagonistic torque generated by the brakes that the vehicle does not "nose dive", that is, by selecting yoke members of the proper length, the normal tendency of the car to nose dive may be neutralized by the lifting action of the yoke member, thereby causing the vehicle to remain in a horizontal plane.

The tendency of the axle 16 or the axle members 46 to be displaced about a vertical axis would cause the usual steering mechanisms to produce a slight swerving of the front wheels. In order to overcome this tendency of the wheels to swerve, it has been found necessary to rearrange the steering mechanism, so that the connection between the steering rod 56' and the steering lever 58 on the pivoted wheel spindles 36 will be in the vicinity of the vertical axis of oscillation of the axle 16, as shown in Figure 1. While the steering lever 58 might be made of sufficient length to overlie the center of the yoke housing 18, the shifting of the vertical axis of oscillation of the axle 16 into the vicinity of the steering connection has been found to produce the desired result. In order to shift the center of vertical movement of the axle 16, a radius rod 60 is provided, which is pivotally connected by suitable lugs 62 to the axle and connected through a resilient boss 64 to the yoke 6, thus causing the axle 16 to oscillate about the pivotal connection 62. The steering rod 56' is actuated in the usual manner by means of a steering gear lever 64 and acts through crossrod 66 to move both wheels simultaneously.

From the foregoing, it will be seen that an axle mounting has been produced, which allows restricted rotational movement of the axle in all directions, thereby tending to absorb road shock without transmitting it to the frame, yet maintaining an action of the wheels comparable to that of independent front wheel mountings and allowing the use of highly flexible springs for supporting the vehicle frame.

It will also be understood that there can be many variations made in the modifications illustrated and therefore they should be considered as illustrative only and not as limiting the scope of the following claims:

1. In an axle mounting for vehicles, the combination with a vehicle frame of a rigid yoke member, wheel spindles carried by said yoke member, means connecting said yoke member to the frame to allow movement of said spindles toward and from said frame, means connected to the yoke member allowing limited rotational movement of said spindles about the longitudinal axis of the yoke member while preventing extended lateral movement of the spindles relatively to the frame, and resilient means tending to maintain the wheel spindles in spaced relation to said frame.

2. In an axle mounting for vehicles, the combination with a vehicle frame of an axle, rigid yoke member connected to the frame for movement toward and from said frame only, resilient means connecting said axle to said yoke member to allow limited universal rotational movement of said axle relatively to said yoke member, and resilient means engaging said axle tending to maintain said axle spaced from said frame.

3. In an axle mounting for vehicles, the combination with a vehicle frame of an axle, a substantially V-shaped yoke member having spaced ends and a closed end, means pivotally connecting the spaced ends of said yoke to said frame to allow movement of the closed end of the yoke toward and from said frame, resilient means suspending said axle from the closed end of said yoke and allowing limited universal rotational movement of said axle with respect to said yoke, and vehicle spring means bearing against said frame and said axle.

4. In an axle mounting for vehicles, the combination with a vehicle frame of an axle, a substantially V-shaped yoke member pivotally connected to said frame allowing movement of the closed end of said yoke toward and from said frame, means resiliently connecting said axle to the closed end of said yoke and allowing resiliently opposed limited universal rotational movement of said axle relatively to said yoke, and vehicle spring means bearing against said frame and said axle.

5. In an axle mounting for vehicles, the combination with a vehicle frame of a member having converging arms joined to form an apex portion, wheel mounting spindles on the arms of said member, means connecting the apex portion of said member to said frame for pivotal movement of the arms toward and from said frame and for limited rotational movement about an axis in a single plane vertical to said frame, means engaging the arms and associated with the frame maintaining the member against lateral movement relatively to the frame about said apex portion, and spring means tending to maintain the wheel spindles in spaced relationship to said frame.

6. In an axle mounting for vehicles, the combination with a vehicle frame of a substantially V-shaped yoke having converging legs connected, to form an apex, wheel spindles carried by the legs of the yoke, means connecting the apex of the yoke to said frame for substantially universal rotational movement with relation to said frame, means comprising thrust rods pivotally connected to the frame and said legs maintaining said yoke against movement laterally of said frame, and resilient means opposing movement of said yoke toward said frame.

7. In an axle mounting for vehicles, the combination of a frame with a yoke member, means connecting said yoke member to said frame for allowing movement of said yoke toward and from said frame, only, a transverse housing on said yoke member, an axle mounted in said housing, resilient means in said housing allowing relative universal rotational movement between said axle and said housing, and spring means opposing movement of said axle toward said frame.

8. In an axle mounting for vehicles, the combination of a frame with a substantially V-shaped yoke member, means pivotally connecting the legs of said yoke member to said frame for allowing movement of the closed end of said yoke toward and from said frame, a housing on the closed end of said yoke, an axle in said housing, resilient means between said housing and said axle allowing limited universal rotational movement between said housing and said axle and spring means on said frame opposing movement of said axle toward said frame.

9. In an axle mounting for vehicles, the combination with a frame having a steering mechanism thereon and an axle, means connecting said axle to said frame for allowing limited resiliently opposed universal rotational movement of the axle, interconnected wheel spindles pivotally mounted on said axle, a steering lever on one of said spindles, means connected to said lever and said steering mechanism for controlling pivotal movement of said spindles, and means connected to said axle for locating the center of horizontal movement of said axle in the vicinity of the arc of movement of the end of said lever.

10. In a vehicle, a frame, a transverse axle, wheel spindles on the opposite ends thereof, means pivotally connected to the frame and attached to the axle adjacent its center to suspend the axle from and prevent axial movement of the axle relatively to the frame, means connecting the axle to said first named means with capacity for limited universal rotational movement, and spring means interposed operatively between the ends of the axle and the frame to limit yieldingly the movements of the axle towards the frame.

11. In a wheel suspension for vehicles, the combination of a vehicle frame, an axle, wheel-supporting spindles on said axle, means connecting the axle to the frame for limited universal rotational movement about the center of said axle, said means restraining the axle against extended movement laterally of the frame allowing movement of the axle toward and from the frame, and spring means interposed between the ends of the axle and the frame to yieldingly resist movements of the axle toward the frame.

PIERRE MARCEL BOURDON.